UNITED STATES PATENT OFFICE.

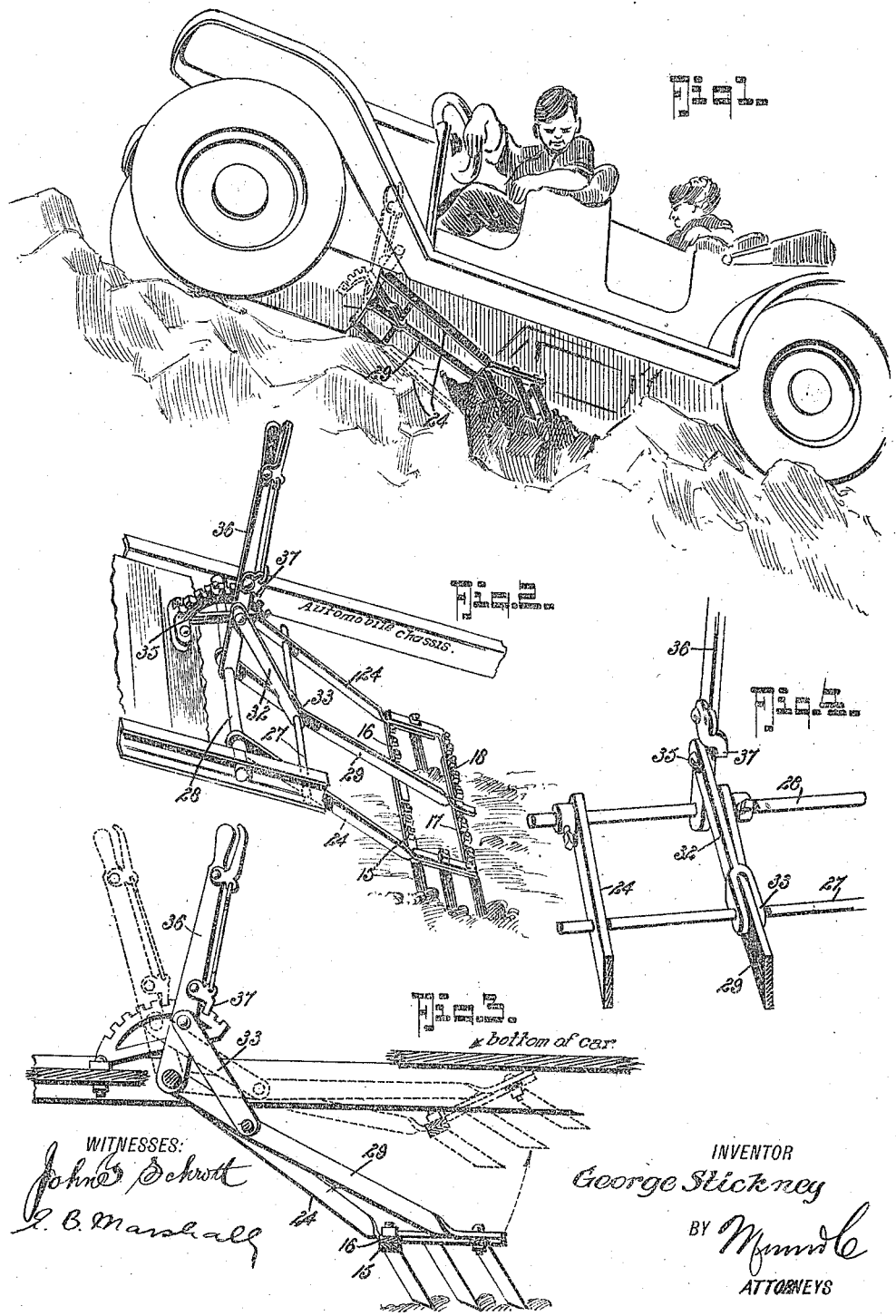

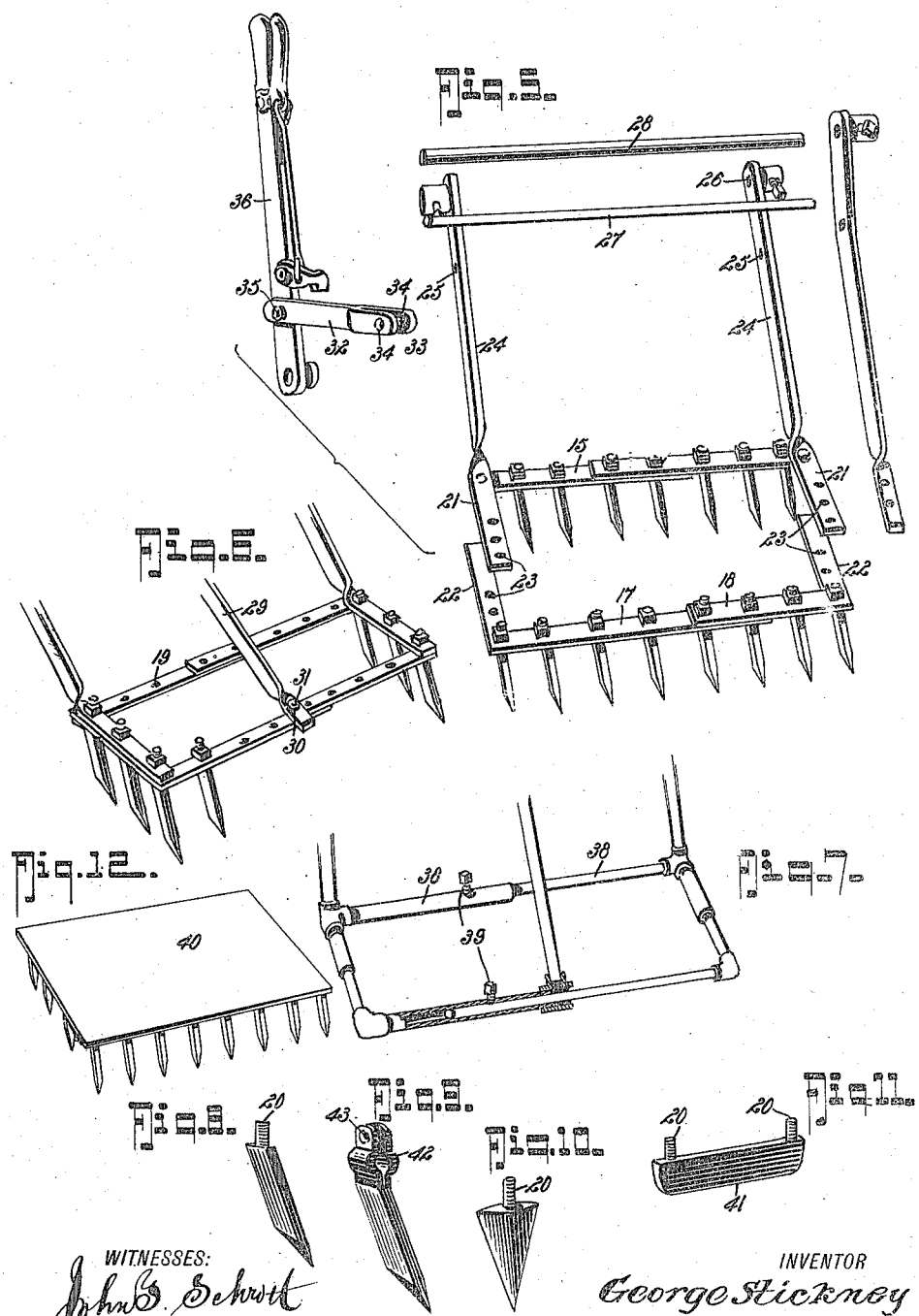

GEORGE STICKNEY, OF CARLTON, OREGON.

BRAKE FOR VEHICLES.

1,221,623. Specification of Letters Patent. Patented Apr. 3, 1917.

Application filed April 27, 1916. Serial No. 93,889.

*To all whom it may concern:*

Be it known that I, GEORGE STICKNEY, a citizen of the United States, and a resident of Carlton, in the county of Yamhill and State of Oregon, have invented a new and Improved Brake for Vehicles, of which the following is a full, clear, and exact description.

My invention has for its object to provide a brake which has teeth and which operates by the movement of the teeth into engagement with the ground. The parts of the brake may be readily assembled, it being possible to adjust the brake to dispose various kinds of teeth as desired, and thereby meet various requirements.

Additional objects of the invention will appear in the following specification, in which the preferred form of my invention is described.

In the drawings similar reference characters denote similar parts in all the views, in which—

Figure 1 is a perspective view illustrating the manner in which the brake is mounted on a vehicle;

Fig. 2 is a perspective view of the brake;

Fig. 3 is a side elevation of the brake;

Fig. 4 is a fragmentary perspective view showing parts of the brake;

Fig. 5 is a perspective view showing the various parts of the brake before they have been fully assembled;

Fig. 6 is a perspective view illustrating the rectangular frame with brake teeth mounted thereon.

Fig. 7 is a perspective view illustrating a modified form of the invention;

Figs. 8, 9, 10 and 11 are views illustrating various kinds of teeth; and

Fig. 12 is a perspective view illustrating another form of the invention.

When my invention is mounted on an automobile, it is possible to bring the brake shoes or teeth into engagement with the ground, so that while the automobile may run up hill, it will be impossible for the automobile to back down the grade should there be engine trouble. If the engine is stopped on the grade, the brake will hold the automobile, and will permit the driver to start the engine and throw in the clutch while the brake still holds the automobile, the engine moving the automobile forward with the brake shoes or teeth dragging on the ground. The brake shoes or teeth may be raised from the ground while the automobile is moving forwardly. The brake may also be used as a drag by moving the brake shoes or teeth into engagement with the ground when desired. This is often of great assistance when running down steep hills.

By referring to the drawings, it will be seen that two pairs of transverse frame members are provided, the forward pair of transverse frame members being indicated by the reference characters 15 and 16, and the rear pair of transverse frame members being indicated by the reference characters 17 and 18, these transverse frame members 15, 16, 17 and 18 being provided with orifices 19. Certain of the orifices 19 in the frame members 15 and 16 are disposed in alinement, and certain of the orifices 19 in the frame members 17 and 18 are disposed in alinement, so that the frame members in each pair may be secured together. I prefer to secure these frame members together by means of brake shoes which have threaded studs 20 which may be disposed through the orifices 19, after which the threaded studs 20 are engaged by nuts 21, so that the brake shoes may be held in position and the transverse frame members may be secured together. These brake shoes may be in various forms, as I will shortly set forth. The forward transverse frame members are connected to the rear transverse frame members by frame members 21 and 22, the frame members 21 and 22 having orifices 23 which may be disposed in alinement after the forward transverse frame members are disposed in adjusted position relatively to the rear transverse frame members, it being possible to dispose the threaded shanks or studs 20 of certain of the shoes in the registering orifices 23, so that the frame members 21 and 22 may be secured together in a manner readily understood. In this way, the size of the rectangular frame composed of the frame members 15, 16, 17, 18, 21 and 22 may be determined.

Extending forwardly from the frame members 21 there are arms 24, the said arms 24 being provided with bearings 25, and additional bearings 26. The arms 24 are connected by a rod 27, the said rod 27 being disposed in the bearings 25, and the arms 24 are journaled at their bearings 26 to a transverse shaft 28 which is mounted on an automobile or other vehicle. In addition to the arms 24, there is an additional central arm 29 which has an orifice 30 disposed in registry with one of the orifices 19 in one of the rear transverse frame members 17 or 18, so that this central arm 29 may be secured to one of the rear transverse members by means of a bolt 31, or by means of one of the threaded studs 20 on a brake shoe. This central arm 29 has a bearing in which the rod 27 is disposed. A link 32 is provided, having a bifurcated end 33 which straddles the central arm 29, the said bifurcated end 33 being provided with bearings 34 in which the rod 27 is disposed. This link 32 is articulated at 35 to a lever 36 which is mounted on a shaft 28. It will, therefore, be seen that when the lever 36 is pushed forwardly, the link 32 will raise the rectangular frame carrying the brake shoes, by means of the arm 29, but when the lever 36 is drawn rearwardly, it will move the rectangular frame downwardly and bring the brake shoes mounted on the rectangular frame in contact with the ground. The usual means 37 is provided for locking the lever 36 in adjusted position.

In Fig. 7, I show another form of the invention in which the rectangular frame is constructed of telescoping tubes 38 which are held in adjusted position by set screws 39.

In Fig. 12, I show still another form of the invention, in which a solid rectangular frame 40 is provided.

Various forms of brake shoes or teeth may be employed. For instance, in Fig. 11, a brake shoe 41 is illustrated which may be disposed longitudinally of the vehicle, this brake shoe 41 having two threaded studs 20, one of which may be disposed in an orifice 19 in the forward transverse frame member 15 or 16, the other threaded stud 20 being disposed in an orifice 19 in one of the rear transverse frame members 17 or 18. In Fig. 10, I illustrate a brake tooth resembling a spear head in construction, and in Fig. 8 is illustrated an inclined brake tooth. In Fig. 9, I illustrate a brake tooth which may be used in connection with the rectangular frame illustrated in Fig. 7 of the drawings, the brake tooth shown in Fig. 9 being provided with a clamp 42 having parts which may be disposed at opposite sides of one of the tubes 38, it being possible to draw the members of the clamp 42 together and against the tube 38 by means of a bolt disposed in orifices 43 with which the members of the clamp 42 are provided.

If desired, the brake shoes 41 may be disposed transversely of the vehicle, in which case the threaded stud 20 on a brake shoe 41 will be disposed in the orifices in the forward or rear transverse frame members.

Having thus described my invention, I claim as new and desire to secure by Letters Patent:

1. In a brake for vehicles, two pairs of transverse frame members, one pair disposed in advance of the other pair, and each pair adjustable relatively to the other pair, means connecting the forward pair of transverse frame members with the rear pair, shoe members mounted on the transverse frame members, and means for mounting the frame members on a vehicle.

2. In a brake for vehicles, two pairs of transverse frame members, one pair disposed in advance of the other, and the transverse members in each pair being adjustable relatively to each other, means for securing the forward pair of transverse frame members in adjusted position relatively to the rear pair, shoe members mounted on the frame members, and means for mounting the frame members on a vehicle.

3. In a brake for vehicles, two frame members each having orifices spaced apart, the frame members being adjustable relatively to each other and an orifice in one frame member being in registry with an orifice in the other frame member, a bolt disposed in the orifices which register with each other for holding the frame members together, shoe members secured in the other orifices and means for mounting the frame members on a vehicle.

4. In a brake for vehicles, frame members, each with orifices, disposed to form a rectangular frame, orifices in each frame member registering with orifices in adjacent frame members, bolts disposed in the registering orifices for holding the frame members together, shoe members secured in the other orifices, and means for mounting the frame on a vehicle.

5. In a brake for vehicles, a frame having shoe members, two arms extending from the frame, a shaft to which the arms are journaled, a lever mounted on the shaft, a link articulated to the lever, and means for articulating the lever to the arms.

6. In a brake for vehicles, a frame having shoe members, three arms spaced apart and extending from the frame, a rod connecting the arms, a shaft to which the arms are journaled, a lever mounted on the shaft, and a link connecting the lever with the rod at the central arm.

7. In a brake for vehicles, a frame having two transverse portions one disposed in front of the other and with an orifice in each transverse portion, a shoe having two studs one disposed in each orifice, and means for mounting the frame on a vehicle.

In testimony whereof I have signed my name to this specification in the presence of two subscribing witnesses.

GEORGE STICKNEY.

Witnesses:
R. L. CONNER,
ALMA STOW.

Copies of this patent may be obtained for five cents each, by addressing the "Commissioner of Patents, Washington, D. C."